US007784364B2

(12) United States Patent
Matzoll et al.

(10) Patent No.: US 7,784,364 B2
(45) Date of Patent: Aug. 31, 2010

(54) OPTICAL SENSOR FOR MEASUREMENT OF STATIC AND DYNAMIC TORQUE

(76) Inventors: Robert J. Matzoll, 50924 Linda La., Unit 13, Shelby Township, MI (US) 48317; Thomas T. Stapleton, 1900 Buell Ct., Rochester, MI (US) 48306

( * ) Notice: Subject to any disclaimer, the term of this patent is extended or adjusted under 35 U.S.C. 154(b) by 56 days.

(21) Appl. No.: 12/110,701

(22) Filed: Apr. 28, 2008

(65) Prior Publication Data
US 2009/0266178 A1 Oct. 29, 2009

(51) Int. Cl.
*G01L 3/02* (2006.01)
(52) U.S. Cl. .................. 73/862.326; 73/800
(58) Field of Classification Search .... 73/862.324–326, 73/862.326, 800
See application file for complete search history.

(56) References Cited

U.S. PATENT DOCUMENTS

| | | | |
|---|---|---|---|
| 3,834,822 A | 9/1974 | Stapleton et al. | |
| 4,244,219 A * | 1/1981 | Takahashi | 73/309 |
| 4,345,481 A | 8/1982 | Schroyer | |
| 4,347,748 A | 9/1982 | Pierson | |
| 4,430,566 A | 2/1984 | Searle | |
| 4,446,746 A * | 5/1984 | Aoshima et al. | 73/862.324 |
| 4,527,898 A | 7/1985 | Stapleton | |
| 4,693,123 A | 9/1987 | Bacardit | |
| 4,746,805 A | 5/1988 | Stapleton | |
| 4,785,675 A | 11/1988 | Takasu et al. | |
| 4,896,544 A | 1/1990 | Garshelis | |
| 4,982,105 A | 1/1991 | Takahashi | |
| 5,001,937 A | 3/1991 | Bachtel et al. | |
| 5,014,560 A * | 5/1991 | Hutchison et al. | 73/862.324 |
| 5,153,445 A | 10/1992 | Stapleton | |
| 5,233,407 A | 8/1993 | Ogata | |
| 5,247,839 A | 9/1993 | Okutani et al. | |
| 5,253,531 A | 10/1993 | Walker et al. | |
| 5,331,169 A | 7/1994 | Tanaka et al. | |
| 5,369,583 A | 11/1994 | Hazelden | |
| 5,477,332 A | 12/1995 | Stone et al. | |
| 5,490,430 A | 2/1996 | Anderson et al. | |
| 5,531,127 A | 7/1996 | Hazelden | |
| 5,606,137 A | 2/1997 | Penketh | |
| 5,636,024 A | 6/1997 | Crookham et al. | |
| 5,636,137 A | 6/1997 | Hazelden | |
| 5,723,794 A | 3/1998 | Discenzo | |
| 5,754,295 A | 5/1998 | Mitchell | |
| 5,837,908 A | 11/1998 | Ng et al. | |
| 5,841,132 A | 11/1998 | Horton et al. | |
| 5,859,919 A | 1/1999 | Holland et al. | |
| 5,864,393 A | 1/1999 | Maris | |
| 5,878,153 A | 3/1999 | Mikulec et al. | |
| 5,918,286 A * | 6/1999 | Smith et al. | 73/862.324 |

(Continued)

FOREIGN PATENT DOCUMENTS

DE   19823903   12/1999

(Continued)

*Primary Examiner*—Max Noori
(74) *Attorney, Agent, or Firm*—Young Basile

(57) ABSTRACT

An optical static and dynamic torque sensor provides a measurement of torque, torque angle, shaft speed or shaft direction by optically detecting the overlapped position of spatially arranged apertures on discs attached to input and output ends of a flexure as torque is applied to the flexure.

12 Claims, 6 Drawing Sheets

U.S. PATENT DOCUMENTS

| | | |
|---|---|---|
| 6,055,860 A | 5/2000 | Pfanstiehl |
| 6,088,116 A | 7/2000 | Pfanstiehl |
| 6,188,058 B1 | 2/2001 | Tullis |
| 6,318,188 B1 | 11/2001 | Yassui et al. |
| 6,341,426 B1 | 1/2002 | Okumura |
| 6,347,554 B1 | 2/2002 | Klingler |
| 6,354,156 B1 | 3/2002 | Porth et al. |
| 6,381,526 B1 | 4/2002 | Higashi et al. |
| 6,382,034 B1 | 5/2002 | Yasui et al. |
| 6,386,052 B1 | 5/2002 | Satch et al. |
| 6,426,497 B1 | 7/2002 | Martinez et al. |
| 6,450,044 B1 | 9/2002 | Eisenhauer et al. |
| 6,456,090 B1 | 9/2002 | Ikhikawa et al. |
| 6,501,068 B1 | 12/2002 | Eisenhauer |
| 6,504,275 B2 * | 1/2003 | Nondahl et al. ........... 310/68 B |
| 6,513,394 B1 | 2/2003 | Gutjahr et al. |
| 6,587,211 B1 | 7/2003 | Gelbart |
| 6,679,126 B2 * | 1/2004 | Dalton et al. .......... 73/862.324 |
| 6,761,075 B2 | 7/2004 | Steinlechner |
| 2002/0104388 A1 * | 8/2002 | Schrubbe ............... 73/862.328 |
| 2003/0015590 A1 | 1/2003 | Chen |

FOREIGN PATENT DOCUMENTS

| | | |
|---|---|---|
| DE | 199332965 | 1/2001 |
| GB | 2093991 | 9/1982 |
| WO | WO0218894 | 3/2002 |

* cited by examiner

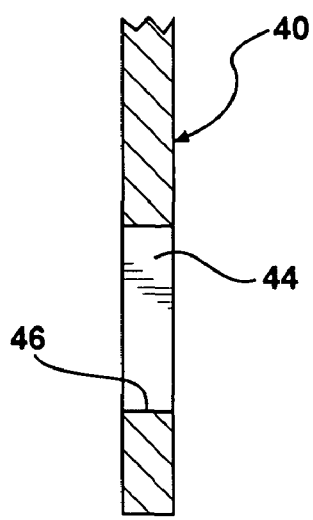
FIG. 4A
FIG. 4B
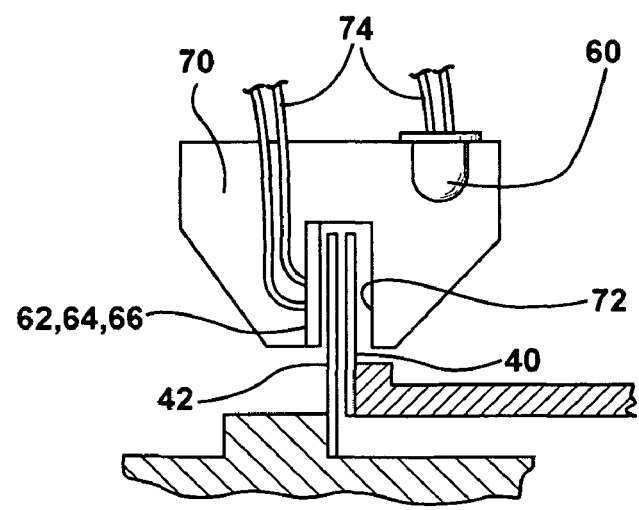
FIG. 5

OPTICAL SENSOR FOR MEASUREMENT OF STATIC AND DYNAMIC TORQUE

BACKGROUND

The present invention relates to torque sensors, specifically to torque sensors using non-contact optics for the measurement of torque, torque angle, flexure speed, flexure direction and flexure rotational travel.

A conventional method and device for measuring torque generally requires physical contact with a torque sensor center shaft. Applying torque to a shaft generates two principal lines of stress along helical lines which are orthogonal to each other on the surface of the shaft. Strain gauges are bonded in a cross arrangement along the helical lines. The strain gauges are coupled to measuring electronics by slip rings. However, these arrangements are difficult to implement.

Non-contact, optical based torque sensors are also known. Such sensors make use of a flexure or shaft, typically formed of metal. One end of the shaft is connected to a driving member, such as a motor, and the other end is connected to a tool or bit which drives a fastener, such as a bolt, to a tightened state, for example. Increased torque on the output end of the shaft as the bolt tightens causes rotation of the output end to lag behind rotation of the driven input end of the shaft. This lag can be used as an indicator of the amount of rotation of the output end which is proportional to the applied torque.

One example of an optically based torsion sensor measures torsion in a rotating shaft. This sensor requires usage of two bands consisting of alternating high and low reflectivity regions. The bands are stationed on the shaft at the desired locations of measurement. A sensor head is located to correspond to each band and includes comprising a light source and a light detector. Light is projected onto the respective band by the corresponding sensor head. Furthermore, each sensor head collects the light reflected by the high reflectivity region(s) of the corresponding band. The phase displacement between the intensities of the reflected light at the sensor heads is used to determine torsion on the rotating shaft.

However, it would be desirable to provide a torque sensor with non-contact optics to make implementation a lot simpler than conventional torque measurement methods and devices. It would also be desirable to provide a dynamic torque sensor that is not just limited to the measurement of torque, but is also capable of measuring torque angle, flexure speed, and flexure direction of travel. It would also be desirable to provide a torque sensor with static torque measuring capability.

SUMMARY

An apparatus for the measurement of any of the torque, torque angle, flexure speed, flexure direction, and flexure rotational travel. The apparatus includes a non-contact rotary optical sensor, and a rotatable element.

The sensor includes a flexure having input and output ends, the input and output ends angularly displaced with respect to each other under a torque load applied to the first end. First and second co-axial members are provided with the first member fixed and rotatable with the first end of the flexure, and the second member fixed to the second end of the flexure and rotatable with the second end of the flexure.

A plurality of apertures is formed in each of the discs attached to the first and second members. The apertures are equally circumferentially spaced in the first and second member discs having substantially identical width and height. A light source is fixed relative to the flexure and transmits a light field toward the apertures in the second member disc.

A plurality of co-linear light intensity detectors are fixed relative to the first member disc. The detectors detect the magnitude of light passing through the plurality of overlapped apertures in the first and second member discs.

The detectors and the first and second member discs with their respective apertures are operative so that all of the light passing through a pair of overlapped apertures in the first and second member discs will be received by at least one of the detectors at any given time.

The disclosed apparatus has been designed to simplify the complex audit method required for critical joints with high installation torque and frictional scatter. The sensor has been designed to provide a torque sensor with non-contact optics to make implementation simpler than conventional torque measurement methods and devices. Furthermore, the sensor is a dynamic torque sensor that is not limited to the measurement of torque as conventional torque measurement devices because the invention is also capable of measuring torque in a stalled condition, torque angle, flexure speed, and flexure rotational distance and direction of travel.

BRIEF DESCRIPTION OF THE DRAWING

The various features, advantages and other uses of the present invention will become more apparent by referring to the following detailed description and drawing in which:

FIGS. 4A and 4B are cross-sectional views of different aspects of the apertures in the disc shown in FIG. 3;

FIG. 5 is an enlarged view of the discs, light source and photo detectors shown in FIG. 1;

DETAILED DESCRIPTION

Figure 1:
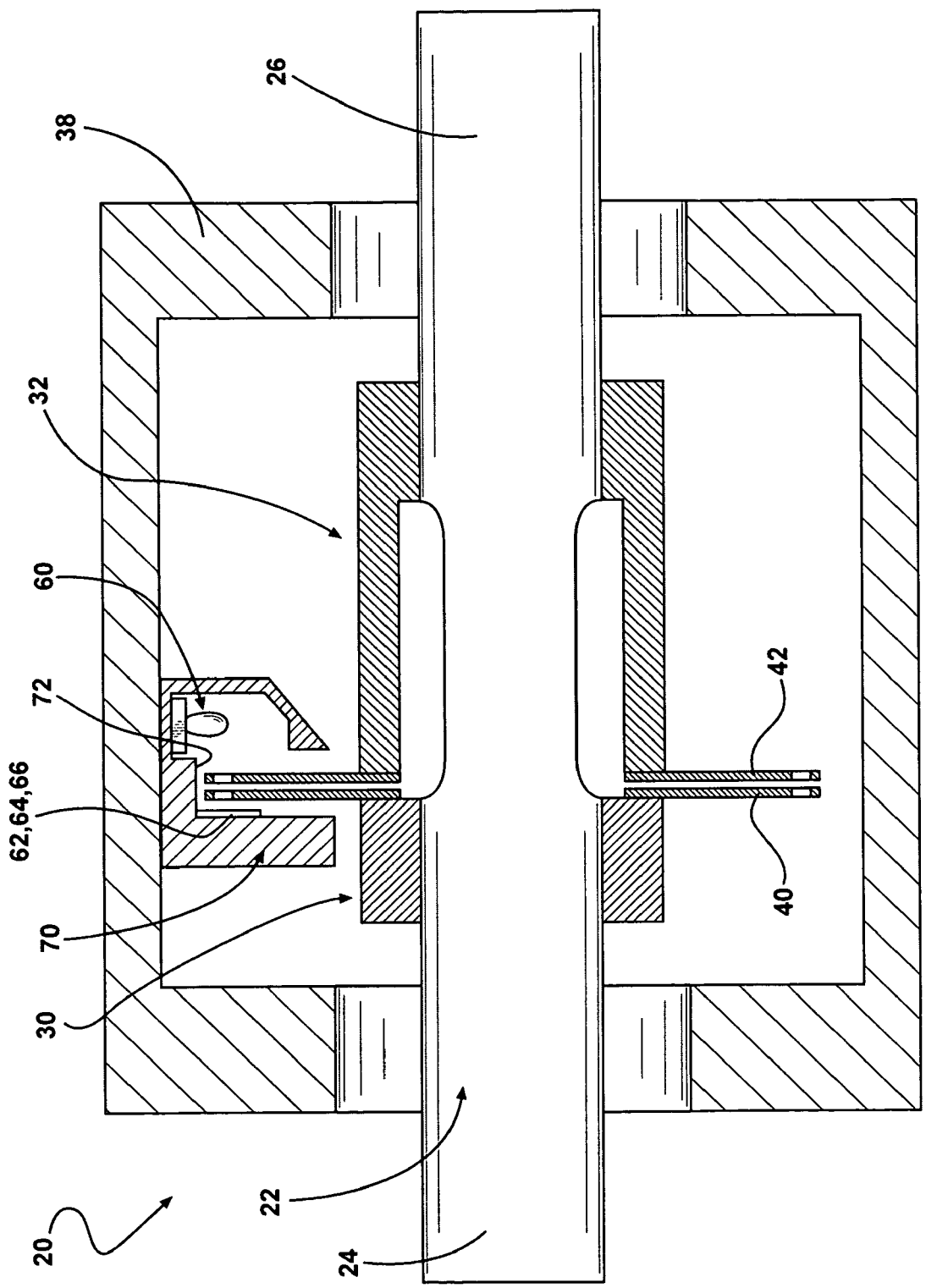
FIG. 1 is a front longitudinal cross-sectional view of an optical static and dynamic torque sensor.
Figure 2:
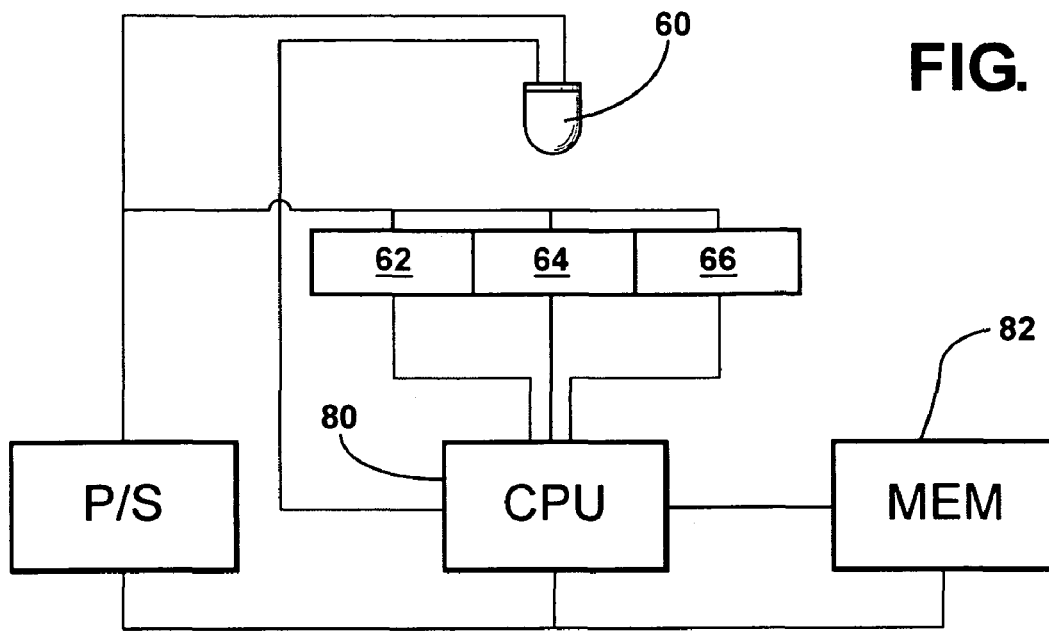
FIG. 2 is a pictorial representation of the control circuitry of the sensor of FIG. 1.
Figure 3:
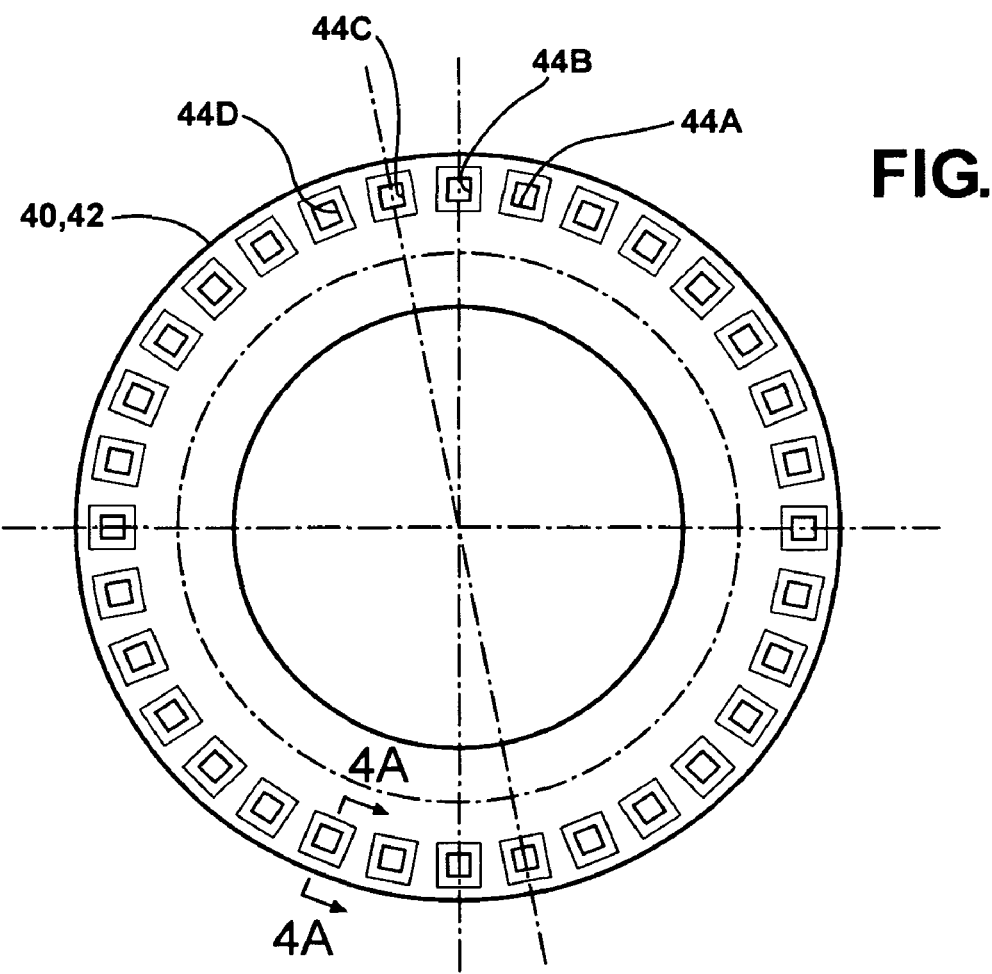
FIG. 3 is a front elevational view of one of the apertured input and output discs of the sensor.
Figure 6:
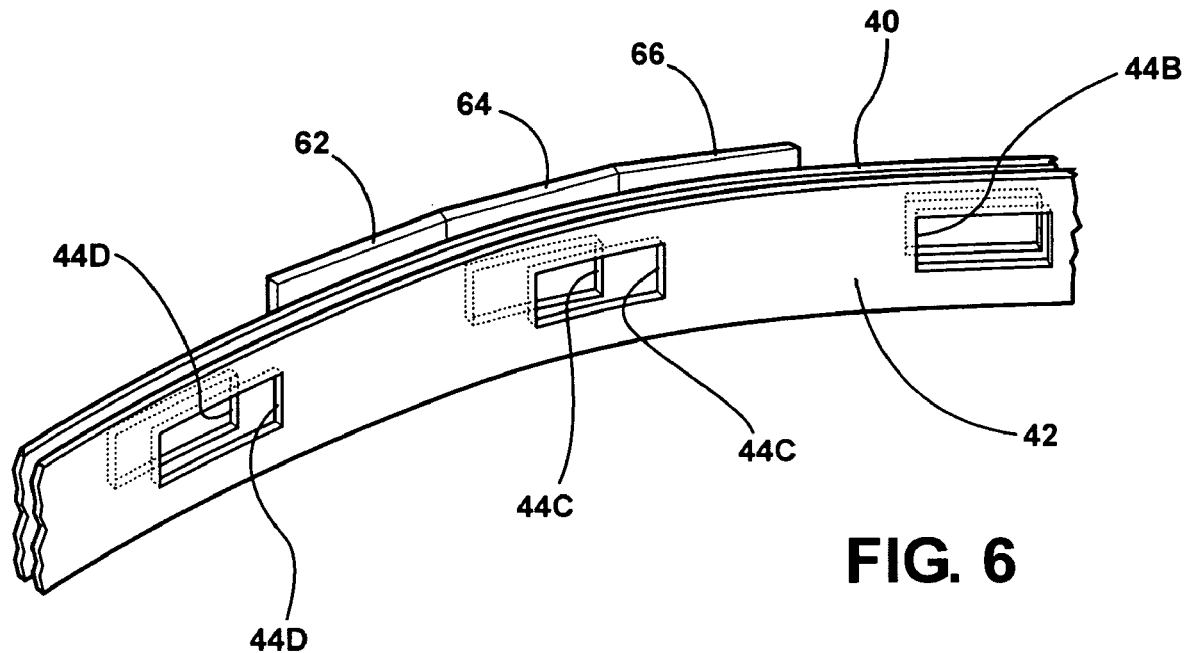
FIG. 6 is a partial, enlarged perspective view showing the arrangement of the apertures in the input and output discs and their relation to the photo detectors.

With reference now to the drawings. FIGS. 1 and 2 show an optical sensor apparatus 20 which is particularly useful in measuring static and dynamic torque being transmitted to a rotatable element, such as a fastener. The apparatus 20 includes an element called a flexure 22 or shaft with an input end 24 in line with a torque transmitting mechanism and an output end 26 that will angularly displace to a degree that is proportional to the torque transmitted to the fastener. The displacement is then measured to yield a measurement of torque. The non-contact optical method of measurement described herein measures the amount of flexure displacement, flexure speed, and/or flexure direction and flexure rotational travel.

Displacement can occur by twist or compression of the flexure 22 relative to the rotation of a torque transmitting mechanism and a driver member, attached to the input and output end 24A and 26A, respectively, of the flexure 18 22.

The flexure 22 can be formed of a metal, such as steel or other materials, such as displaceable polymer, such as urethane, elastomer, synthetic rubber, etc. A urethane formed flexure 22 will have sufficient rigidity so that an output end 26 will repeatedly displace the same amount under the same applied torque or force over a wide load and temperature range.

Separate input and output substantially co-axial cylindrically shaped collars 30 and 32, respectively, slide over the input and output ends 24 and 26, respectively, of the flexure 22. The collars 30 and 32 are fixedly secured to the flexure 22 generally intermediate the input and output ends 24 and 26, as shown in FIG. 1. Welding, fasteners, adhesive, etc., may be used to fixedly mount the collars 30 and 32 on the flexure 22.

Two generally circular input and output optical discs 40 and 42, respectively, are fixedly mounted on the adjacent opposing ends of the input and output collars 32 and 34. The input and output discs 40 and 42 face each other and are generally located in the middle of the sensor 20.

After the input and output collars 32 and 34 have been secured in position on the flexure 22 with the discs 40 and 42 facing each other, the flexure 22 can then be pressed into sealed bearings secured in each end of the sensor's body or housing 38.

Each input and output optical disc 40 and 42 is formed of a thin, substantially rigid material, such as metal, plastic, etc. Each disc 40 and 42 has a plurality of apertures which may take a variety of different forms, such as elongated slots, or oval, trapezoidal, circular or polygonal shapes. It will be understood that the generally square shape of each aperture 44 is by way of example only.

The edge 46 of each aperture 44 may be formed with a knife edge 46. The knife edge 46 can be achieved by forming each disc 40 and 42 of a thin material, as seen in FIG. 4A. Alternately, thicker discs 40 and 42 may be provided, as shown in FIG. 4B. A thicker configuration, a recess 48 is formed at the location of each aperture 44 to reduce the thickness of the aperture 44 and to form the knife edge 46.

As the ends 24 and 26 of the flexure 22 twist relative to each other during the application of a torque to the input end 24, a relative angular change or deflection occurs between the input end 24 and the output end 26. This relative change is measured by use of the apertures 44 in each disc 40 and 42. By way of example only, each disc 40 and 42 can have 32 apertures equally circumferentially spaced near the outside edge of each disc 40 and 42. Each aperture 44 is in the form of a square hole, 0.05" on a side. The discs 40 and 42 are aligned relative to each other so that, at zero torque or no twist, the apertures 44 on the input and output disc 40 and 42 have no or a minimal overlap. As torque increases, the resulting twist displaces the output disc 42 relative to the input disc 40 so that the overlap increases. When the apertures 44 become fully aligned, the sensor has reached its upper limit of torque measurement. Any higher torque would cause misalignment of the slots 44 and a reduced output signal rather than the correct increase in signal strength.

Figure 9A:
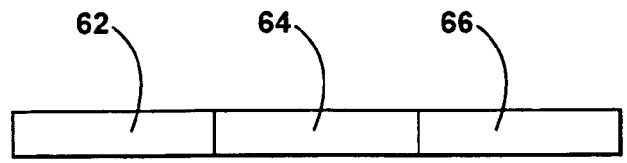
FIGS. 9A and 9B are pictorial representations of different arrangements of the photo detectors used in the torque sensor.
Figure 9B:
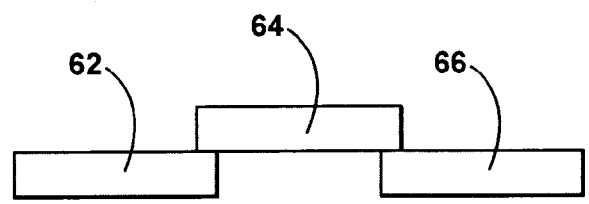

To measure twist and, therefore, torque, it is necessary to select the detector receiving the most light and measure its output. An optical system is provided to do this which includes, as shown in FIGS. 1, 2 and 5, a single light source, such as a lighting emitting diode or LED 60. A plurality of light sensitive detectors, such as photo detectors is employed. At least two or more, and preferably three or more photo detectors, with three photo detectors 62, 64 and 66 being depicted, by way of example only, are arranged side by side in FIG. 9A next to one side of the output disc 42. An alternate overlapped or staggered arrangement of the detectors 62, 64 and 66 is shown in FIG. 9B.

As shown in FIG. 1, a holder 70 is mountable inside of the body 38 of the sensor 20 and carries the photo detectors and light source or LED 60 which is positioned to direct a more or less uniform field of light toward the apertures 44 in the discs 40 and 42.

As shown in FIGS. 1 and 5, the light source or LED 60 may be mounted in any suitable position within the holder 70. As shown in FIG. 1, the LED 60 may be mounted such that the light emitted by the LED 60 is reflected off an interior surface of the holder 70 toward the discs 40 and 42. Alternately, the LED 60 may be mounted directly in line with the apertures 44 in the discs 40 and 42.

The discs 40 and 42 are freely rotatable through a recess 72 in the holder 70. The photo detectors 62, 64 and 66 are fixedly mounted on one side of the recess 72 adjacent the input disc 40. Conductors 74 extend from the holder 70 to the control circuitry as described hereafter and shown in FIG. 2.

As the discs 40 and 42 rotate with the flexure 22, the apertures 44 pass in front of the detectors 62, 64, and 66 and allow light from the LED 60 to pass through to the detectors 62, 64, and 66 in an amount which is proportional to the degree of overlap between the apertures 44 in the discs 40 and 42, which, in turn, is proportional to the torque.

Three or more detectors 62, 64, and 66 assure that at least one of the detectors 62, 64, and 66 is receiving all of the light passing through a single pair of overlapped or aligned apertures 44 in the discs 40 and 42, yet a single detector never receives light from more than one aperture pair at a time; thus, at all times, at least one detector is receiving all of the light from an aperture pair but never from more than one aperture pair.

Figure 7:
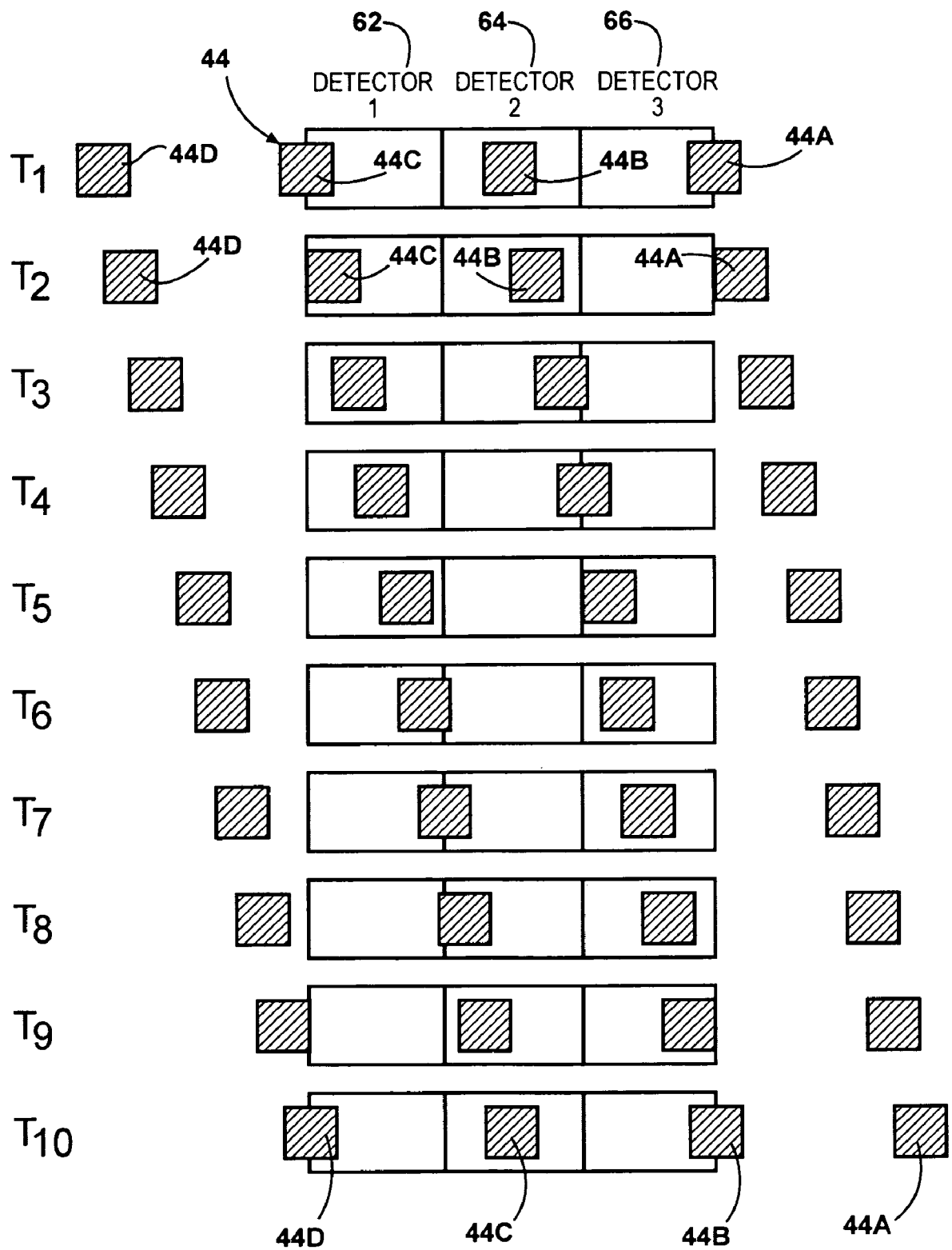
FIG. 7 is a pictorial representation showing possible positions of the apertures in the input and output discs in a sequential spatial relationship to the detectors.

FIG. 7 illustrates how the apertures 44 and the discs 40 and 42 align with the detectors 62, 64 and 66 but any single detector never receives light from more than one aperture pair. It will be understood that in normal operation, as torque is applied to the input end 24 of the flexure or shaft 22, the output end 26, which is attached to the driven member, such as a fastener, will apply the torque to the driven member or fastener, but lag behind rotation of the input end 24. This causes the apertures 44 on the output disc 42 to angularly rotate a smaller amount or lag behind the amount of rotation of the apertures 44 in the input disc 40. During such rotation, the apertures 44 in the output disc 42 move from an aligned zero torque position with the apertures 44 in the input disc 40 to different degrees of non-alignment.

In FIG. 7, it can be seen that in each position of the discs 40 and 42, at least one detector 62, 64 or 66 has a fully aligned pair of overlapped apertures 44. However, there are never two aligned pairs of apertures 44 aligned with a single detector 62, 64, 66. As the input and output discs 40 and 42 rotate bringing the apertures 44 into and out of alignment, at least one of the aligned pairs of apertures 44 will be completely in front of the one of the photo detectors 62, 64, or 66. Only a portion of the adjacent pairs of apertures 44 in the input and output discs 40 and 42 will be aligned with the adjacent photo detector 62, 64, or 66. The CPU 80 in FIG. 2 will recognize the one photo detector 62, 64, or 66 registering the greatest intensity or magnitude of light consistent with a fully aligned pair of apertures 44 in the discs 40 and 42 completely aligned with the one detector 62,64, or 66. As shown in FIG. 7, (ten time periods) the apertures 44B in the discs 40 and 42 are fully aligned with the detector 64, while the adjacent apertures 44A and 44C in the discs 40 and 42 are only partially aligned with the adjacent photo detectors 66 and 62, respectively.

As torque is continued to be applied to the flexure 22, the discs 40 and 42 continue to rotate with the apertures 44 moving into and out of alignment with the detectors 62, 64 and 66 as shown in the $T_1$-$T_{10}$ time periods. In each $T_1$-$T_{10}$ time period, at least one of the aligned pairs of apertures 44A, B or C is fully aligned with one of the detectors 62, 64, or 66. For example, in $T_1$ and $T_2$, the apertures 44B in the discs 40 and 42 are shown aligned with the detector 64. In $T_3$-$T_5$, the apertures 44C in the discs 40 and 42 are aligned with the photo detector 62. In $T_6$-$T_8$, the apertures 44B in the discs 40 and 42 have moved into full alignment with the photo detector 66. In $T_9$-$T_{10}$, the apertures 44C in the discs 40 and 42 have moved into full alignment with the photo detector 64.

Figure 8:
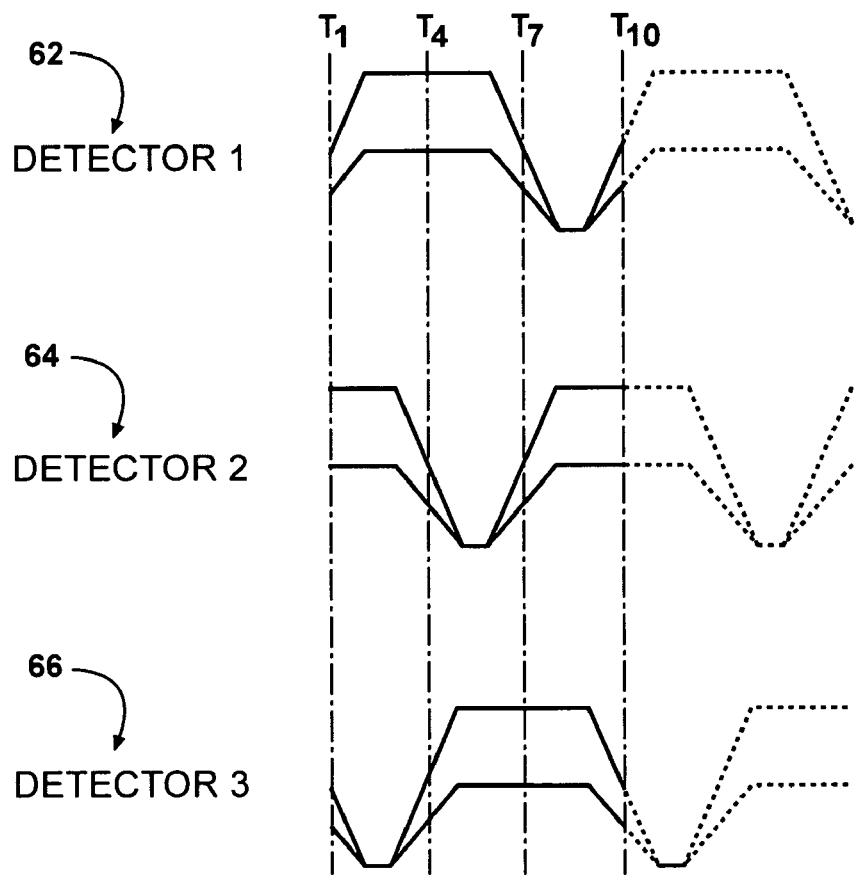
FIG. 8 depicts grafts of the output signal waveforms from the three detectors over the various time periods shown in FIG. 7.

Signals generated by the detectors 62, 64, and 66 have the form shown in FIG. 8. The waveforms or graphs in FIG. 8 depict the output signal amplitudes for each detector 62, 64, and 66. This illustrates the variation in output signal strength the detector 62, 64, and 66 generate depending upon the position of the apertures 44 relative to the detectors 62, 64 and 66.

Measurement of torque from the output signals of the three detectors 62, 64, and 66 is straight forward. At a time chosen by the central processor or control, the signals from the three detectors 62, 64, and 66 are sampled and their amplitudes in either analog or digital form are compared with each other, with the largest signal amplitude chosen as a true measurement since it must have come from a detector which is in full alignment with a pair of apertures 44 in the discs 40 and 42.

Since the light field that illuminates the apertures 44 may not be perfectly uniform and, since the detectors 62, 64, and 66 may not have the exactly identical sensitivity, it is desirable to "normalize" the three detectors 62, 64 and 66. Such normalization can be accomplished, for example, by providing means for adjusting the output signal values of each of the detectors 62, 64, and 66 so that adjusted values have equal sensitivity to the torque. This can be done by the use of look-up tables or a normalizing factor for each detector 62, 64, and 66. The comparison to determine the highest output signal would be done on the normalized data.

With this arrangement, it is possible to measure torque at any time, as often as desired, and at any shaft speed, including an idle or zero, stationary position. The light source 60 would need to be turned on only when a measurement is to be made. If desired, shaft speed can be measured by sampling one of the detectors 62, 64, 66 continuously, and counting the rise and falls of the output signal from the selected detector for a given time period.

Since the angular distance of the individual aperture pairs in the discs is known, the "torque angle", or the angle through which the flexure 22 turns after the torque reaches a threshold torque value, can be measured by counting the same rises and falls of a selected detector 62, 64 or 66 until the flexure 22 comes to a stop.

By using information from all three detectors 62, 64, and 66, the torque angle can be detected to a resolution of three times the frequency of the number of slots in each disc 40 and 42. In the case of the present design, this would be one part in 32×3 or $\frac{1}{96}^{th}$ revolution which equals 3.75°.

Torque can also be measured in a stall condition since the measurement process is not dependent upon or affected by continuous motion of the discs 40 and 42.

The measurement of torque would not be effected by a change in position which the tool using the sensor apparatus 20 is held. A shift in position of the tool would, however, effect the measurement of torque angle. If a measurement of torque angle is desired, the operator needs to hold the tool in a constant rotational angular position until the driving shaft comes to a complete stop.

Figure 10:
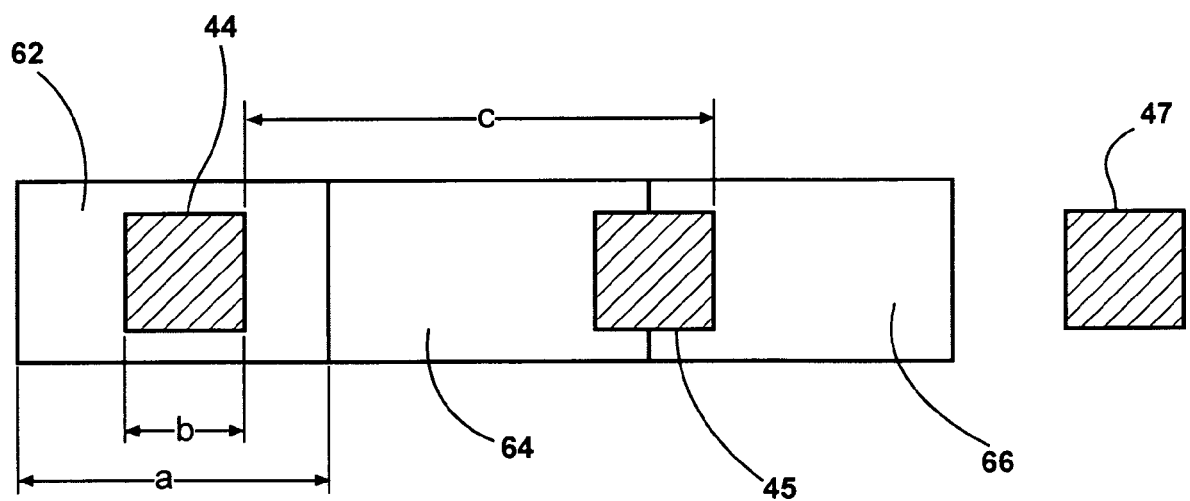
FIG. 10 is a pictorial representation of the apertures in the input and output discs in the dimensional arrangement of the sensor.

To assure that one and only one pair of aligned apertures 44 in the discs 40 and 42 is always aligned with only one of the detectors 62, 64, and 66 at any given time, the relationship between aperture 44 size, aperture 44 spacing, and the size of the detectors 62, 64, and 66 should be, as shown in FIG. 10, as follows:

$2a=b+c$, and $a \leq 2b$, where a equals the width of each detector, b is the width of each aperture, and c is the aperture spacing.

When this relationship exists, one of the pairs of aligned apertures 44 in the discs 40 and 42 will always be fully aligned with at least one of the detectors 62, 64, or 66 as shown in FIG. 7, with no other aperture pairs 44 contributing light to that one detector.

In order to determine the clockwise or counterclockwise direction of the flexure 22, the output from the three detectors 62, 64 and 66 are analyzed during torque measurements. As the flexure 22 is rotating, the detector that is used for reading the torque changes as the aperture pairs pass by the three detectors 62, 64 and 66. The detector with the highest voltage reading is the detector that is directly in line with an aperture pair. As the flexure 22 rotates, aperture pairs move to align with the detectors 62, 64 and 66 in a fixed sequence, which is determined by the direction of rotation. Direction of rotation, therefore, is determined by the order of the sequence that the detectors give the highest reading. The speed of rotation of the flexure 22 is determined by measuring the time elapsed between the shift of the highest reading from one detector to another. If the shaft is turning in one direction, the detectors will switch in sequential order (62-64-66-62-64-66 . . . ). If the direction is reversed, the order is reversed (62-64-66-62-64-66 . . . .)

For example:

| Last Detector | Current Detector | Direction |
|---|---|---|
| 62 | 64 | A |
|  | 66 | B |
| 64 | 62 | B |
|  | 66 | A |
| 66 | 62 | A |
| 66 |  | B |

What is claimed is:

1. A sensor apparatus for use with a torque transmitting mechanism applying torque to a driver member comprising:
   a flexure having input and output ends, the input and output ends angularly displaced with respect to each other under a torque load applied to the first end;
   first and second co-axial members, the first member fixed and rotatable with the first end of the flexure, the second member fixed to and rotatable with the second end of the flexure;
   a first disc and a second disc respectively fixed to the first and second co-axial members;
   a plurality of equally circumferentially spaced apertures in the first and second discs, the apertures having substantially identical width and height;

a light source fixed relative to the flexure and transmitting a light field toward the apertures in the first and second discs; and at least three light intensity detectors fixed relative to the first and second discs, the detectors detecting the magnitude of light passing through a plurality of overlapping apertures in the first and second discs, each detector arranged to receive light from the light source through overlapped apertures in the first and second discs, with only one detector receiving a maximum light intensity at a time.

2. The apparatus of claim 1 further comprising:
a control counting each consecutive passage of each pair of overlapping past at least one light intensity detector.

3. The apparatus of claim 2 wherein:
the control operative to detect the sequence of the at least three light intensity detectors which detect the overlapping apertures in the first and second discs to determine the direction of rotation of the flexure.

4. The apparatus of claim 2 wherein:
the apertures in each of the first and second discs extend over a 360° symbol extent of the first and second discs.

5. The apparatus of claim 1 wherein:
the at least three light detectors are arranged circumferentially co-linear.

6. The apparatus of claim 1 wherein:
the at least three light intensity detectors are arranged according to the formula $2a=b+c$, and $a \leq 2b$; where a equals a detector width, b equals a disc aperture width, and c is the spacing between each disc aperture.

7. The apparatus of claim 1 wherein the plurality of apertures in the first and second discs have identical shapes.

8. A method for sensing torque applied to a driver member by a torque transmitting mechanism comprising the steps of:
coupling first and second coaxial members to a flexure having input and output ends which are angularly displaced with respect to each other during a torque load applied to the first end of the flexure, the first member fixed and rotatable with the first end of the flexure, and the second member fixed to and rotatable with the second end of the flexure;

mounting a first disc and a second disc respectively on the first and second members;

providing a plurality of equally circumferentially spaced apertures in the first and second discs, the apertures having substantially identical width and height;

fixing a light source relative to the flexure for transmitting a light field toward the apertures in the first and second discs; and fixing at least three light intensity detectors relative to the first and second discs, the detectors detecting the magnitude of light passing through a plurality of overlapping apertures in the first and second discs, each detector arranged to receive light from the light source through overlapped apertures in the first and second discs, with only one detector receiving a maximum light intensity at a time.

9. The method of claim 8 further comprising the step of:
counting each consecutive passage of each pair of overlapping apertures past at least one light intensity detector.

10. The method of claim 8 further comprising the step of:
detecting the sequence of the at least three detectors which detect the overlapping apertures in the first and second discs to determine the direction of rotation of the flexure.

11. The method of claim 8 wherein the step of providing a plurality of equally circumferentially spaced apertures in the first and second discs further includes the step of:
providing the plurality of equally circumferentially spaced apertures in the first and second discs over a 360° symbol extent of each of the first and second discs.

12. A sensor apparatus for use with a torque transmitting mechanism applying torque to a driver member comprising:
means for coupling first and second coaxial members to a flexure having input and output ends which are angularly displaced with respect to each other during a torque load applied to the first end of the flexure, the first member fixed and rotatable with the first end of the flexure, and the second member fixed to and rotatable with the second end of the flexure;

means for mounting a first disc and a second disc respectively on the first and second member;

means for providing a plurality of equally circumferentially spaced apertures in the first and second discs, the apertures having substantially identical width and height;

means for fixing the light source relative to the flexure for transmitting a light field toward the apertures in the first and second discs; and means for fixing at least three light intensity detectors relative to the first and second discs, such that the detectors detect the magnitude of light passing through a plurality of overlapping apertures in the first and second discs, each detector arranged to receive light from the light source through overlapped apertures in the first and second discs, with only one detector receiving a maximum light intensity at a time.

\* \* \* \* \*